(12) United States Patent
Chen

(10) Patent No.: US 7,044,384 B2
(45) Date of Patent: May 16, 2006

(54) DUAL USAGE MEMORY CARD CONNECTOR

(75) Inventor: Yuan-Hua Chen, Taoyuan Hsien (TW)

(73) Assignee: Kingconn Technology Co., Ltd., Taoyuan Hsien (TW)

( * ) Notice: Subject to any disclaimer, the term of this patent is extended or adjusted under 35 U.S.C. 154(b) by 73 days.

(21) Appl. No.: 10/841,537

(22) Filed: May 10, 2004

(65) Prior Publication Data

US 2005/0247786 A1 Nov. 10, 2005

(51) Int. Cl.
*G06K 7/00* (2006.01)

(52) U.S. Cl. .................... 235/486; 235/411; 439/79; 710/52; 709/213

(58) Field of Classification Search ........... 235/486, 235/441; 439/79; 710/52; 709/213
See application file for complete search history.

(56) References Cited

U.S. PATENT DOCUMENTS

| | | | |
|---|---|---|---|
| 6,341,964 B1* | 1/2002 | Yu | 439/79 |
| 6,786,415 B1* | 9/2004 | Yiu | 235/486 |
| 2004/0110423 A1* | 6/2004 | Shishikura et al. | 439/630 |
| 2004/0161976 A1* | 8/2004 | Lee | 439/630 |
| 2004/0184246 A1* | 9/2004 | Le et al. | 361/764 |
| 2004/0230789 A1* | 11/2004 | Lee | 713/2 |
| 2005/0051626 A1* | 3/2005 | Hsiao | 235/441 |
| 2005/0055481 A1* | 3/2005 | Chou et al. | 710/52 |
| 2005/0086320 A1* | 4/2005 | Blair et al. | 709/213 |

* cited by examiner

*Primary Examiner*—Karl D. Frech
*Assistant Examiner*—Allyson N Trail
(74) *Attorney, Agent, or Firm*—Rosenberg, Klein & Lee

(57) ABSTRACT

A dual usage memory card connector includes a housing holding a set of terminals, the housing having two spring arms disposed at two sides and movable between a first position where a MS Duo memory card is insertable into the housing and a second position where a MS memory card is insertable into the housing, a metal top cover covering the housing, the top cover having a spring plate, a curved holding down portion forwardly extended from the spring plats for holding down a MS or MS Duo memory card inside the housing, and two limiters for holding the spring arms in the first position for the insertion of a MS Duo memory card into the housing, the spring plate being forced upwards to disengage the limiters from the spring arms upon insertion of a MS memory card.

3 Claims, 6 Drawing Sheets

DUAL USAGE MEMORY CARD CONNECTOR

BACKGROUND OF THE INVENTION a. Field of the Invention

The present invention relates to a memory card connector and more particularly, to a dual usage memory card connector, which is practical for use with a Sony MS (Memory Stick) memory card as well as a MS Duo memory card.

b. Description of the Related Art

Following fast development of information industry, a variety of mobile personal electronic apparatus have been developed, and have appeared on the market. These mobile personal electronic apparatus include PDA, digital camera, digital video camera, and electronic dictionary. These mobile electronic apparatus commonly have an expansion slot for receiving a memory card, for example, a CF (Compact Flash), SM (Smart Media), SD (Secure Digital), MMC (MultiMedia Card), MS (Memory Stick), or MS Duo memory card. However, the expansion slot of a conventional mobile electronic apparatus is specifically designed for receiving one particular model of memory card only.

SUMMARY OF THE INVENTION

The present invention has been accomplished under the circumstances in view. It is the main object of the present invention to provide a dual usage memory card connector, which is practical for use with a Sony MS (Memory Stick) memory card as well as a MS Duo memory card.

To achieve this and other objects of the present invention, the dual usage memory card connector comprises an electrically insulative housing, the housing comprising a forwardly extended receiving open chamber, which fits a MS (Memory Stick) memory card, a top opening, two spring arms suspended at two opposite lateral sides thereof and movable between a first position for holding a MS Duo memory card in the receiving open chamber and a second position for holding a MS memory card in the receiving open chamber, the spring arms each having a front clamping tip projecting into the receiving open chamber, and two retaining blocks disposed at the two opposite lateral sides in front of the spring arms; a plurality of terminals respectively mounted in the housing and extended to a rear side of the housing; and a metal top cover covered on the housing, the top cover comprising two retaining holes disposed at two opposite lateral sides thereof and respectively coupled to the retaining blocks of the housing, a transversely extended top suspension spring plate, a curved holding down portion forwardly extended from the top suspension spring plats and projecting through the top opening into the inside of the front receiving open chamber for holding down a memory card in the front receiving open chamber, and two limiters respectively formed integral with two distal ends of the top suspension spring plats and adapted to hold the spring arms in the first position. When inserted a MS Duo memory card into the receiving open chamber, the limiters hold the spring arms in the first position, the spring arms and the curved holding down portions of the spring plate of the top cover hold down the inserted MS Duo memory card in contact with the terminals. When inserted a MS memory card into the receiving open chamber, the limiters are forced by the inserted MS memory card to disengage the spring arms from the first position, enabling the spring arms to move to the second position by spring power thereof, and the curved holding down portions of the spring plate of the top cover hold down the inserted MS Duo memory card in contact with the terminals.

DETAILED DESCRIPTION OF THE PREFERRED EMBODIMENTS

Figure 1:
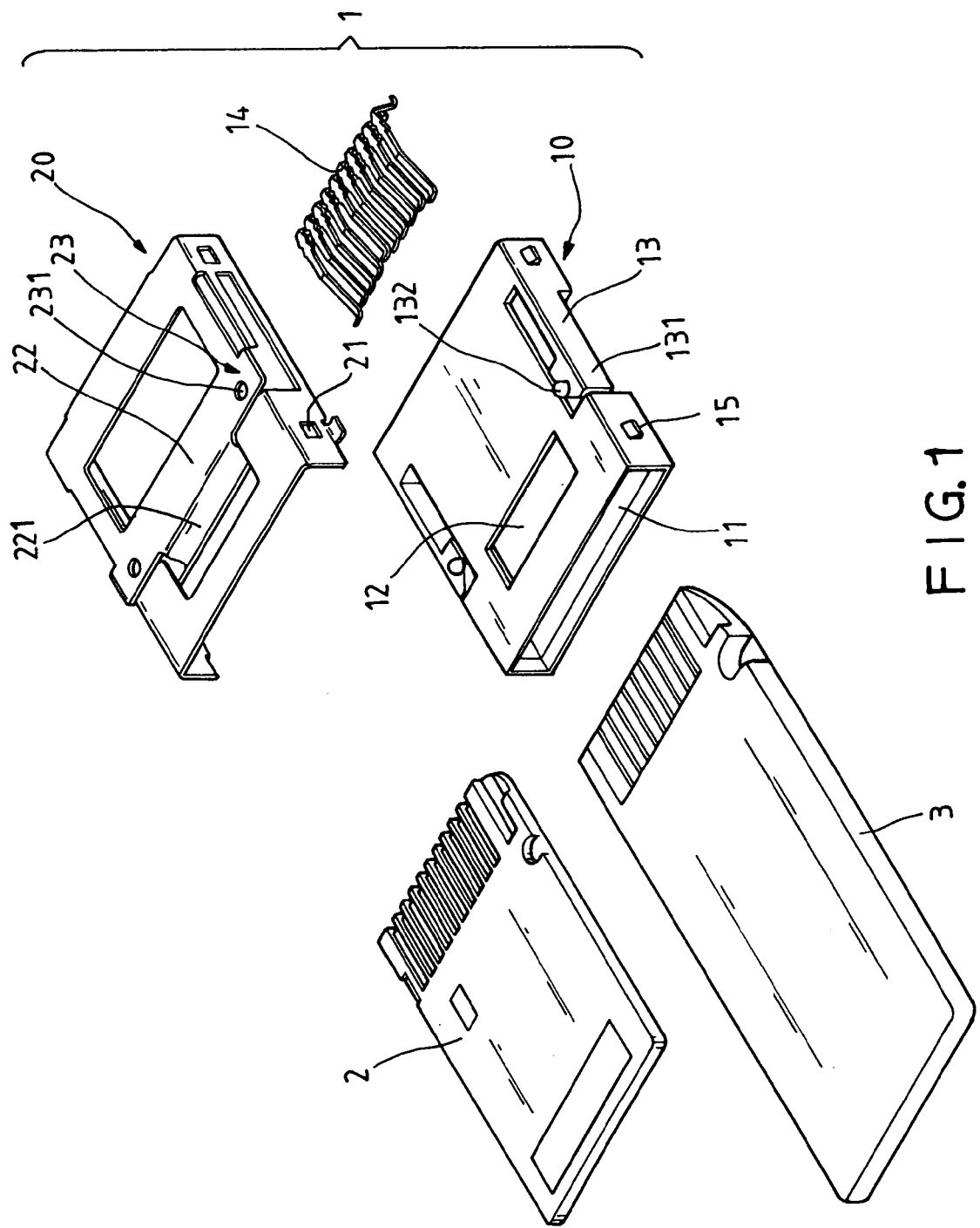
FIG. 1 is an exploded view of a dual usage memory card connector according to the present invention.
Figure 2:
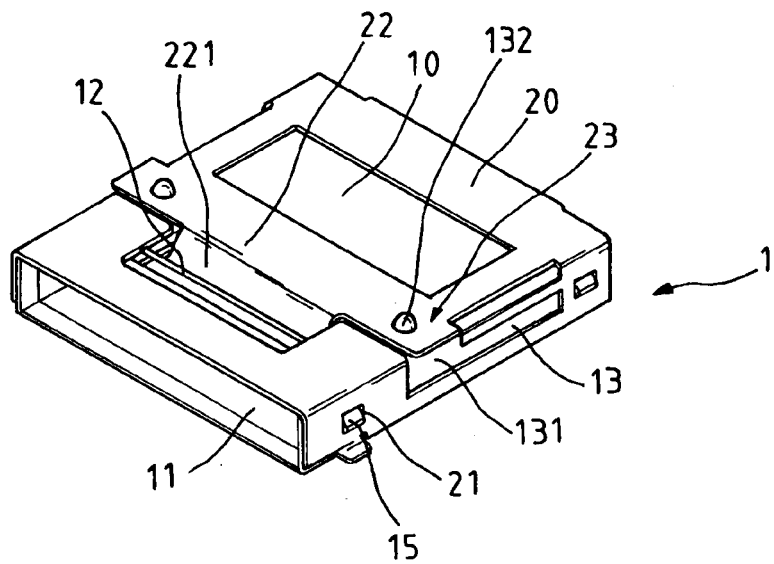
FIG. 2 is an elevational assembly view of the dual usage memory card connector according to the present invention.
Figure 3:
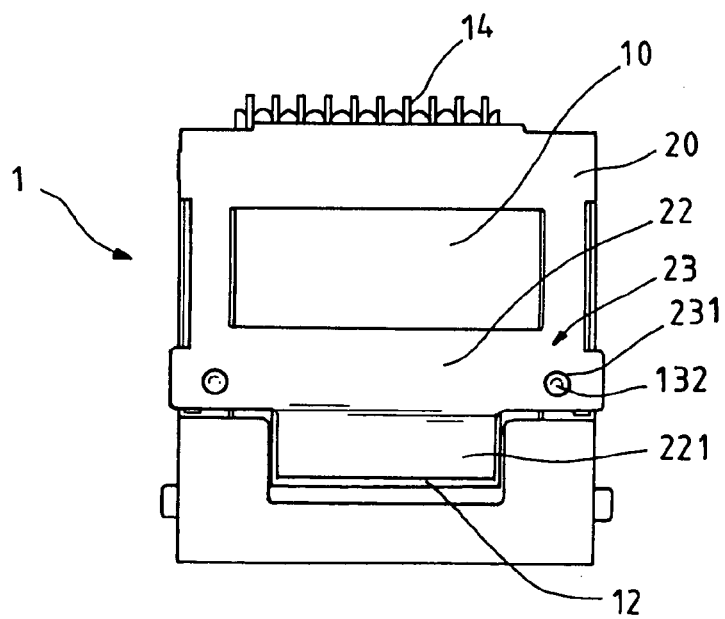
FIG. 3 is a top view of the dual usage memory card connector according to the present invention.
Figure 4:
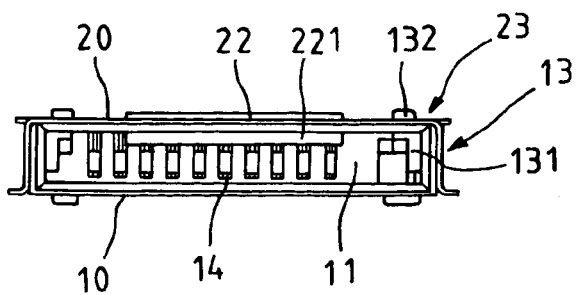
FIG. 4 is a front view of the dual usage memory card connector according to the present invention.

Referring to FIGS. 1~4, a dual usage memory card connector in accordance with the present invention is shown comprised of an electrically insulative housing 10, a top cover 20, and a plurality of terminals 14.

The housing 10 comprises a forwardly extended receiving open chamber 11, which fits a MS memory card, a top opening 12, two spring arms 13 suspended at the two opposite lateral sides thereof, each spring arm 13 having a front clamping tip 131 projecting into the receiving open chamber 11 and a raised portion 132 protruded from the top side of the front clamping tip 131, and two retaining blocks 15 disposed at the two opposite lateral sides in front of the spring arms 13.

The terminals 14 are respectively mounted in the housing 10 and extended to the rear side of the housing 10.

The top cover 20 is a metal shell comprising two retaining holes 21 disposed at two opposite lateral sides and respectively coupled to the retaining blocks 15 of the housing 10, a transversely extended top suspension spring plate 22, a curved holding down portion 221 forwardly extended from the top suspension spring plate 22 and projecting through the top opening 12 into the inside of the front receiving open chamber 11 for holding down a MS or MS Duo memory card in the front receiving open chamber 11, and two limiters 23 respectively formed integral with the two distal ends of the top suspension spring plate 22 corresponding to the spring arms 13 of the housing 10. The limiters 23 each comprise a locating hole 231 corresponding to the raised portion 132 of each of the two spring arms 13 of the housing 10.

Figure 5:
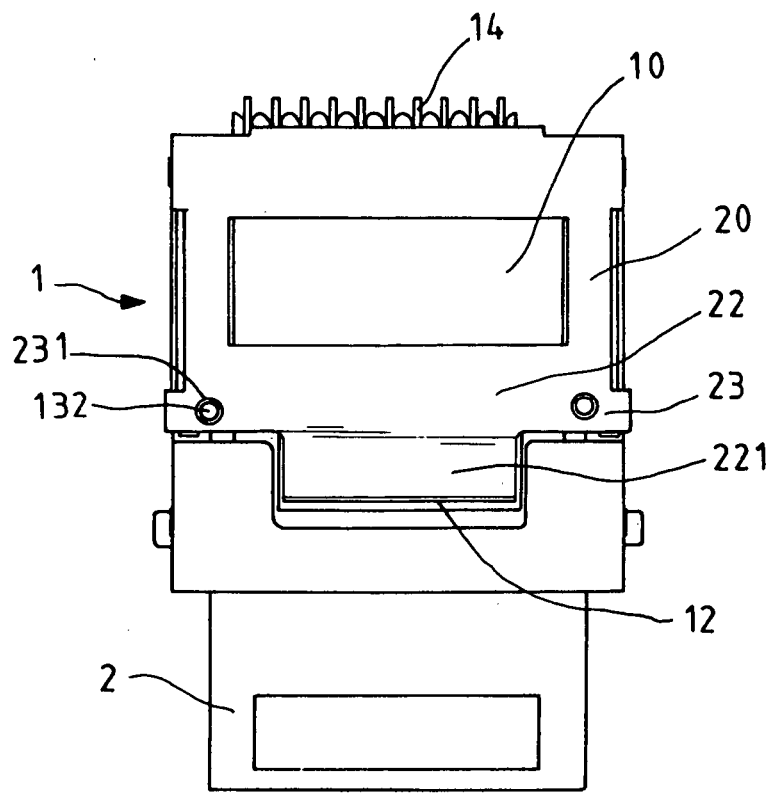
FIG. 5 is a top plain view showing a MS Duo memory card inserted into the dual usage memory card connector according to the present invention.
Figure 6:
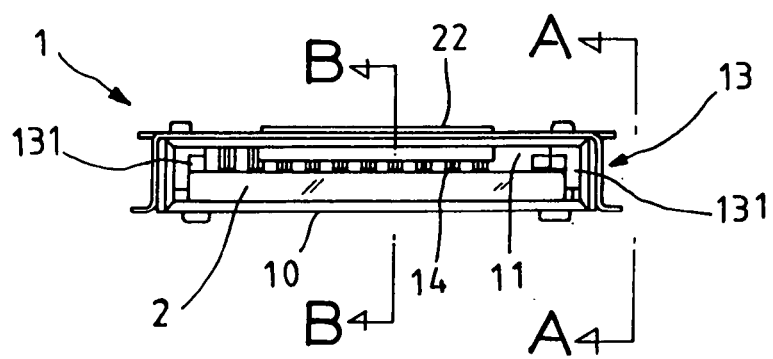
FIG. 6 is a front view of FIG. 5.
Figure 7:
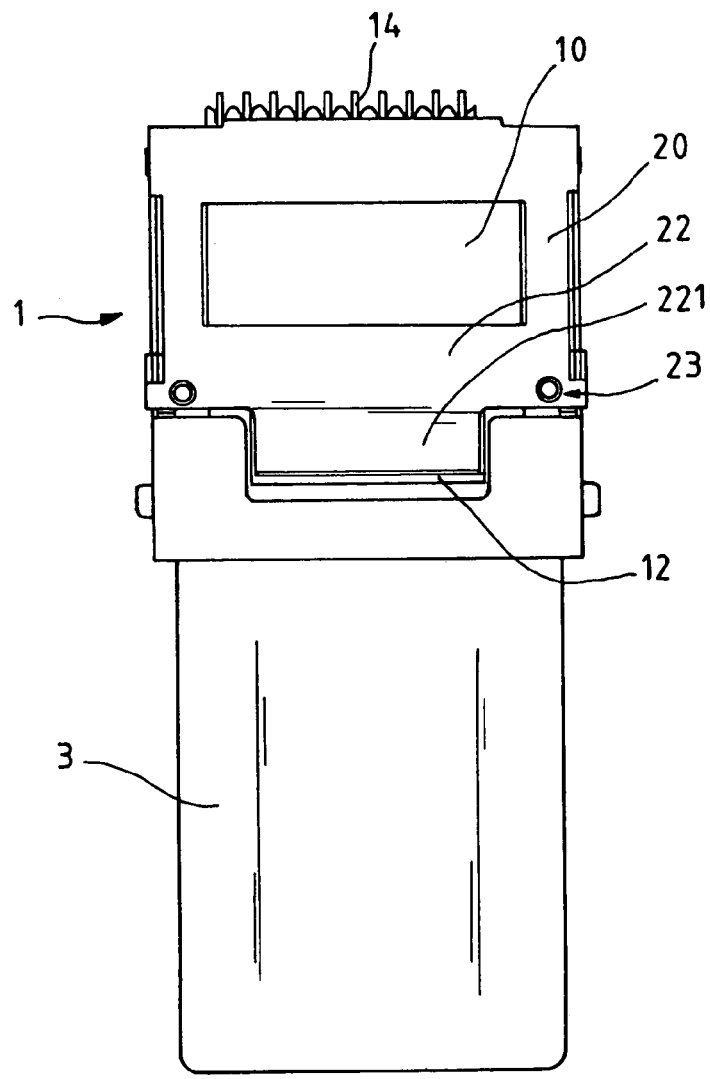
FIG. 7 is a top plain view showing a MS memory card inserted into the dual usage memory card connector according to the present invention.
Figure 8:
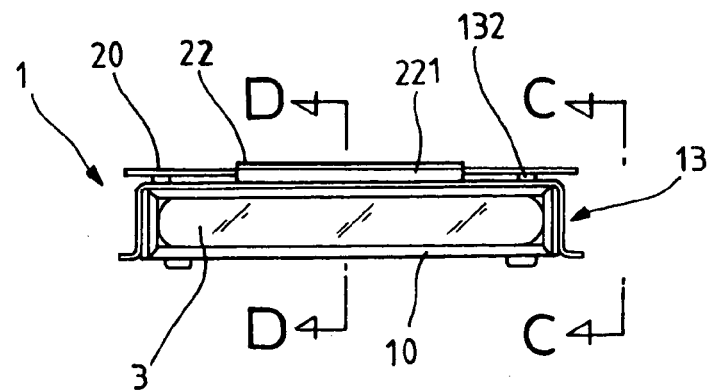
FIG. 8 is a front view of FIG. 7.
Figure 9:
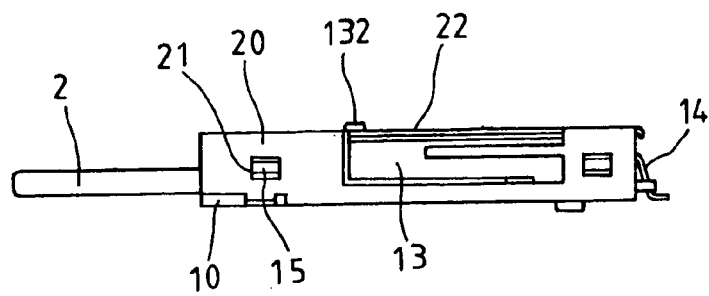
FIG. 9 is a sectional view taken along line A—A of FIG. 6.
Figure 10:
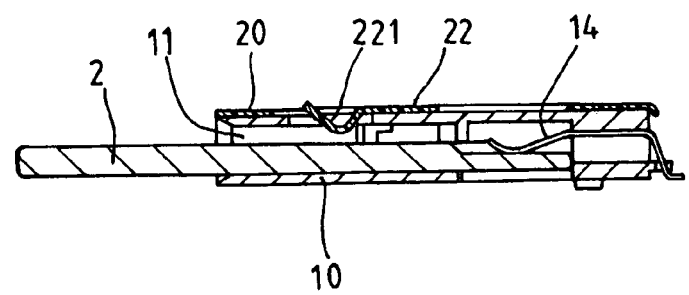
FIG. 10 is a sectional view taken along line B—B of FIG. 6.
Figure 11:
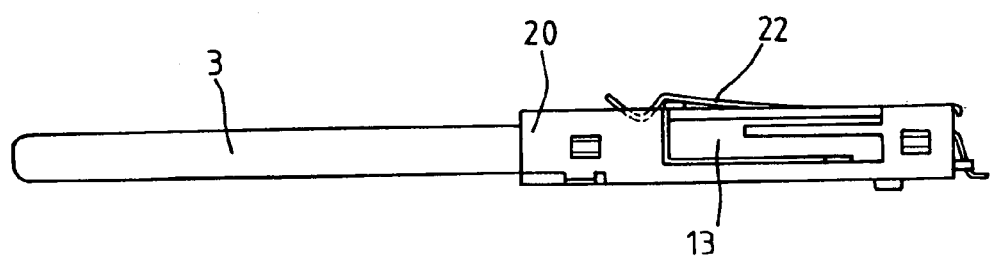
FIG. 11 is a sectional view taken along line C—C of FIG. 8.
Figure 12:
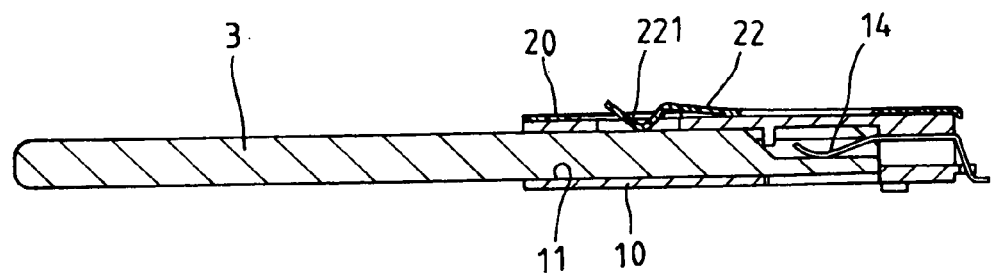
FIG. 12 is a sectional view taken along line D—D of FIG. 8.

Referring to FIGS. 5 and 6, normally, the locating hole 231 of each limiter 23 is respectively coupled to the raised portion 132 of each of the spring arms 13 to hold the spring arms 13 in a first position where the front clamping tip 131 of each spring arm 13 is held projecting into the receiving open chamber 11 for holding a MS Duo memory card 2.

Referring to FIGS. 7~12, when inserting a MS memory card 3 into the receiving open chamber 11, the MS memory card 33 will touch the front side of the curved holding down portion 221 of the top suspension spring plate 22 at first and will then force the top suspension spring plate 22 upwards from the aforesaid first position to a second position where the locating holes 231 of the limiters 23 are disengaged from the raised portions 132 of the spring arms 13, and therefore the MS memory card 3 can be inserted into position and kept in positive contact with the terminals 14.

As indicated above, by means of the design of the spring arms 13 of the housing 10 to match with the locating holes 231 of the top cover 20, the dual usage memory card connector is practical for use with a MS Duo memory card 2 as well as a MS memory card 3.

Figure 13:
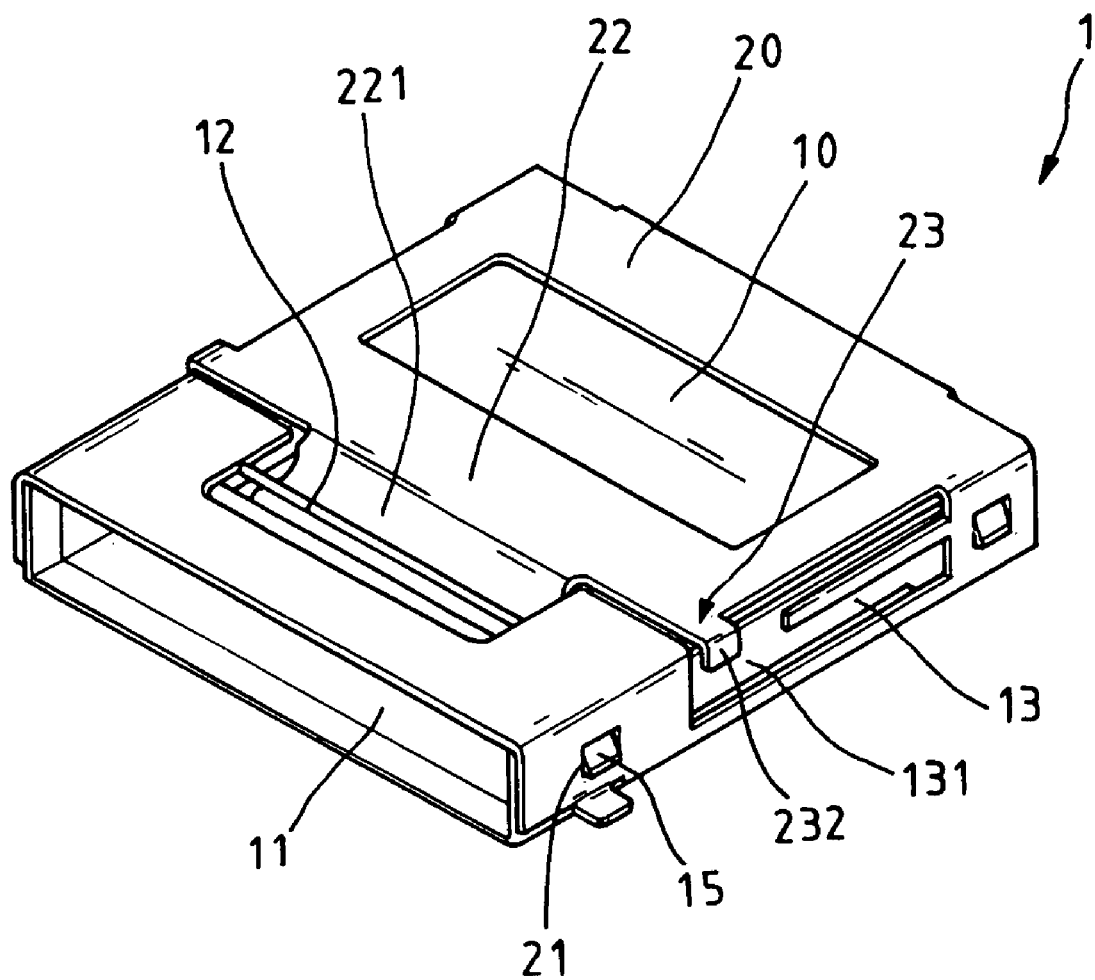
FIG. 13 is an elevational view of an alternate form of the dual usage memory card connector according to the present invention.

FIG. 13 shows an alternate form of the dual usage memory card connector according to the present invention. According to this alternate form, the limiters 23 each are comprised of a hook 232 respectively hooked on the spring arms 13 to hold the spring arms 13 in a first position where the front clamping tip 131 of each spring arm 13 is held projecting into the receiving open chamber 11 for holding a MS Duo memory card 2. When inserting a MS memory card 3 into the receiving open chamber 11, the top suspension spring plate 22 will be forced upwards from the aforesaid first position to a second position where the hooks 232 of limiters 23 are disengaged from the spring arms 13 and therefore the MS memory card 3 can be inserted into position and kept in positive contact with the terminals 14.

A prototype of dual usage memory card connector has been constructed with the features of FIGS. 1~13. The dual usage memory card connector functions smoothly to provide all of the features discussed earlier.

Although particular embodiments of the present invention have been shown and described, it will be understood that various modifications and changes could be made thereunto without departing from the spirit and scope of the invention disclosed.

What is claimed is:

1. A dual usage memory card connector comprising:
   an electrically insulative housing, said housing comprising a forwardly extended receiving open chamber, which fits a MS (Memory Stick) memory card, a top opening, two spring arms suspended at two opposite lateral sides thereof and movable between a first position for holding a MS Duo memory card in said receiving open chamber and a second position for holding a MS memory card in said receiving open chamber, said spring arms each having a front clamping tip projecting into the receiving open chamber, and two retaining blocks disposed at the two opposite lateral sides in front of said spring arms;
   a plurality of terminals respectively mounted in said housing and extended to a rear side of said housing; and
   a metal top cover covered on said housing, said top cover comprising two retaining holes disposed at two opposite lateral sides thereof and respectively coupled to the retaining blocks of said housing, a transversely extended top suspension spring plate, a curved holding down portion forwardly extended from said top suspension spring plate and projecting through said top opening into the inside of said front receiving open chamber for holding down a memory card in said front receiving open chamber, and two limiters respectively formed integral with two distal ends of said top suspension spring plate and adapted to hold said spring arms in said first position;
   wherein when inserted a MS Duo memory card into said receiving open chamber, said limiters hold said spring arms in said first position, said spring arms and the curved holding down portions of said spring plate of said top cover hold down the inserted MS Duo memory card in contact with said terminals; when inserted a MS memory card into said receiving open chamber, said limiters are forced by the inserted MS memory card to disengage said spring arms from said first position, enabling said spring arms to move to said second position by spring power thereof, and the curved holding down portions of said spring plate of said top cover hold down the inserted MS Duo memory card in contact with said terminals.

2. The dual usage memory card connector as claimed in claim 1, wherein said spring arms each comprise a raised portion protruded from the respective clamping tip at a top side; said limiters each comprise a locating hole adapted to receive the raised portion of one said spring arm.

3. The dual usage memory card connector as claimed in claim 1, wherein said limiters each comprise a hook respectively hooked on said spring arms to hold said spring arms in said first position.

* * * * *